United States Patent
Miyanabe et al.

(10) Patent No.: US 6,687,204 B2
(45) Date of Patent: Feb. 3, 2004

(54) CROSSTALK REMOVAL APPARATUS AND INFORMATION REPRODUCTION APPARATUS

(75) Inventors: Shogo Miyanabe, Tsurugashima (JP); Hiroki Kuribayashi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/138,638

(22) Filed: May 6, 2002

(65) Prior Publication Data

US 2002/0176335 A1 Nov. 28, 2002

(30) Foreign Application Priority Data

May 23, 2001 (JP) ................................ P2001-154501

(51) Int. Cl.[7] .............................................. G11B 7/00
(52) U.S. Cl. ................................................. 369/47.17
(58) Field of Search ............................ 369/47.1, 47.17, 369/47.18, 47.27, 44.13, 275.3

(56) References Cited

U.S. PATENT DOCUMENTS 6,377,528 B1 * 4/2002 Asano ..................... 369/47.28

* cited by examiner

*Primary Examiner*—Nabil Hindi
(74) *Attorney, Agent, or Firm*—Morgan, Lewis & Bockius LLP

(57) ABSTRACT

There is disclosed a crosstalk removal apparatus in which a main track, one adjacent track, and the other adjacent track in a disk with the tracks formed therein are irradiated with light beams at predetermined intervals in a tangent direction by a pickup. A CTC unit uses delay amounts of respective sample value series corresponding to a reproduction signal of the main track and those of the adjacent tracks to correct delays, and outputs a CTC output signal from which a crosstalk component is removed. A wobble signal detector detects wobble signals of the respective tracks based on a push-pull output of the disk, and a delay circuit controller obtains optimum delay amounts based on a phase relation of the respective wobble signals and sets the delay amounts in the CTC unit.

10 Claims, 12 Drawing Sheets

DISK MOVEMENT DIRECTION

CROSSTALK REMOVAL APPARATUS AND INFORMATION REPRODUCTION APPARATUS

BACKGROUND OF THE INVENTION

1. Field of the Invention

The present invention relates to technical fields of a crosstalk removal apparatus for removing a crosstalk of adjacent tracks included in a reproduction signal of a main track based on the reproduction signal of the main track of an information recording medium and reproduction signals of the one and other adjacent tracks, and an information reproduction apparatus which uses the crosstalk removal apparatus to reproduce recording information from the information recording medium with the tracks formed therein.

2. Description of the Prior Art

Large-capacity information recording media such as a DVD have a problem that a reproduction signal of a main track to be reproduced is influenced by a crosstalk from adjacent tracks and a reproduction quality is deteriorated. Therefore, a crosstalk canceller has been noted in which three light beams are used to simultaneously reproduce three tracks disposed adjacent to one another, a pseudo crosstalk is obtained from the reproduction signals of the adjacent tracks, the crosstalk is subtracted from the reproduction signal of the main track, and the crosstalk is removed.

In general, since three light beams for use in the crosstalk canceller are emitted at predetermined intervals in a track tangent direction, a time difference is generated in the reproduction signal of each track. Therefore, it is necessary to delay the reproduction signal of each track by a predetermined delay amount, cancel the time difference and match phases of the respective reproduction signals before the crosstalk is removed.

On the other hand, the delay amount of the reproduction signal of each track does not always indicate a constant value, and fluctuates with an elapse of time depending on a fluctuation of a laser wavelength and properties of an information recording medium. Therefore, in order to delay the reproduction signal by an appropriate delay amount in the crosstalk canceller, it is necessary to control the delay amount to be optimum in the crosstalk canceller, and to compensate for the fluctuation of the delay amount with time. For example, a jitter value corresponding to the reproduction signal is detected, and the delay amount may be set such that the jitter value is minimized. That is, the crosstalk increases in a deviating state of the delay amount. Therefore, if the delay amount is set in minimizing the jitter value, the crosstalk can be removed in an optimum manner.

In recent years, rewritable information recording media such as a DVD-RAM have increasingly spread. For example, a land groove recording system is used in the DVD-RAM, and recording information can repeatedly be written both in a groove track and a land track. Moreover, the land and groove tracks of the DVD-RAM are subjected to wobbling beforehand in a constant period, and are used as criteria of a timing control.

Usually with the information recording media such as the DVD-RAM, a situation is assumed in which recorded and unrecorded tracks are present in a mixed manner. Therefore, the recording information is not necessarily recorded in the adjacent tracks during reproduction of the main track. When the adjacent tracks are already recorded, the jitter value changes based on the crosstalk, and the delay amount of the crosstalk canceller can therefore be controlled as described above. On the other hand, when the one and other adjacent tracks are unrecorded, the crosstalk does not occur and therefore the jitter value does not change. Even when the jitter value is detected as described above, the delay amount cannot appropriately be controlled with respect to the crosstalk canceller. As a result, when the recorded track suddenly appears in the adjacent track, a reproduction operation is performed in the deviating state of the delay amount of the crosstalk canceller. A problem is that the crosstalk cannot adequately be removed and the main track is not reproduced.

SUMMARY OF THE INVENTION

The present invention has been developed in consideration of the above-described problem, and an object thereof is to provide a crosstalk removal apparatus and information reproduction apparatus which detect a wobble signal and thereby obtain an optimum delay amount even with an unrecorded adjacent track, and can remove a crosstalk with a high precision during reproduction of a recordable information recording medium.

The above object of the present invention can be achieved by a crosstalk removal apparatus of the present invention which removes a crosstalk of one adjacent track and the other adjacent track included in a reproduction signal of main track based on the reproduction signal of the main track as a reproduction object of an information recording medium and reproduction signals of the adjacent tracks. The crosstalk removal apparatus is provided with: a crosstalk removal device which delays the reproduction signals of the main track and the adjacent tracks by predetermined delay amounts corresponding to respective reproduction time differences, extracts the crosstalk from the reproduction signals of the one and other adjacent tracks, and removes the crosstalk from the reproduction signal of the main track; a wobble signal detection device which detects wobble signals corresponding to a wobbling applied to the main track and the adjacent tracks; and a delay amount control device which obtains optimum delay amounts based on a phase relation of the detected wobble signals, and controls the delay amounts to be set with respect to the crosstalk removal device.

According to the present invention, when reproduction signals of a main track, one adjacent track and the other adjacent track are generated during reproduction of an information recording medium, these reproduction signals are delayed by predetermined delay amounts and subsequently a crosstalk is removed. In this case, a wobble signal corresponding to a wobbling applied to each track is detected, and the delay amount is controlled such that the delay amount obtained based on a phase relation of the respective wobble signals is set. The wobbling performed beforehand on the recordable information recording medium is used, and therefore an optimum delay amount can always be obtained without obtaining a jitter value, even when the adjacent tracks are unrecorded. Moreover, since a period of the wobble signal is accurate, the delay amount is controlled with a high precision, and the crosstalk by the adjacent tracks can securely be removed.

In one aspect of the present invention, the delay amount control device detects phase differences between the wobble signal as a criterion and the other wobble signals, and obtains the optimum delay amounts corresponding to the phase differences.

According to this aspect, a criterion is determined among a plurality of detected wobble signals, and a phase difference among the respective wobble signals is detected so as to control the delay amount as described above. Therefore, the accurate delay amount can be obtained in accordance with the wobble signal which has an accurate period.

In another aspect of the present invention, the delay amount control device generates binarized signals of the wobble signals, obtains pulse widths corresponding to deviations of phases between the binarized signal of the wobble signal as the criterion and the binarized signals of the other wobble signals and detects the phase differences.

According to this aspect, the plurality of detected wobble signals are binarized, and a phase difference between the binarized signals is obtained as a pulse width, so that a relatively simple digital circuit can be used to control the delay amount as described above.

In further aspect of the present invention, the delay amount control device detects the phase differences between the wobble signal as a criterion and the other wobble signals, and obtains said delay amounts so that the phase differences are brought close to zero.

According to this aspect, a crosstalk removal device uses the delayed reproduction signal to detect the phase difference as described above, and controls the delay amount in such a manner that the phase difference is brought close to zero. Therefore, a fluctuation of the delay amount with time is constantly fed back and corrected, and the optimum delay amount can steadily be kept.

In further aspect of the present invention, the delay amount control device detects a zero cross of the wobble signal as the criterion, and uses the zero cross as a timing criterion to detect the phase differences.

According to the present invention, to detect the phase difference between the wobble signal as the criterion and the other wobble signals, a zero cross of the wobble signal is detected. In this constitution, the phase difference is detected by a simple processing and the delay amount can be controlled as described above.

The above object of the present invention can be achieved by an information reproduction apparatus of the present invention which reproduces recording information from an information recording medium with tracks formed therein. The information reproduction apparatus is provided with: a reproduction device which generates respective reproduction signals based on reflected lights obtained in irradiating a main track as a reproduction object, one adjacent track, and the other adjacent track with light beams at predetermined intervals in a tangent direction; a crosstalk removal device which delays the reproduction signals of the main track and the adjacent tracks by predetermined delay amounts corresponding to respective reproduction time differences, extracts a crosstalk from the reproduction signals of the one and other adjacent tracks, and removes the crosstalk from the reproduction signal of the main track; a wobble signal detection device which detects wobble signals corresponding to a wobbling applied to the main track and the adjacent tracks; and a delay amount control device which obtains optimum delay amounts based on a phase relation of the detected wobble signals, and controls the delay amounts to be set with respect to the crosstalk removal device.

According to the present invention, when reproduction signals of a main track, one adjacent track and the other adjacent track are generated during reproduction of an information recording medium, these reproduction signals are delayed by predetermined delay amounts and subsequently a crosstalk is removed. In this case, a wobble signal corresponding to a wobbling applied to each track is detected, and the delay amount is controlled such that the delay amount obtained based on a phase relation of the respective wobble signals is set. The wobbling performed beforehand on the recordable information recording medium is used, and therefore an optimum delay amount can always be obtained without obtaining a jitter value, even when the adjacent tracks are unrecorded. Moreover, since a period of the wobble signal is accurate, the delay amount is controlled with a high precision, and the crosstalk by the adjacent tracks can securely be removed.

In one aspect of the present invention, the delay amount control device detects phase differences between the wobble signal as a criterion and the other wobble signals, and obtains the optimum delay amounts corresponding to the phase differences.

According to this aspect, a criterion is determined among a plurality of detected wobble signals, and a phase difference among the respective wobble signals is detected so as to control the delay amount as described above. Therefore, the accurate delay amount can be obtained in accordance with the wobble signal which has an accurate period.

In another aspect of the present invention, the delay amount control device generates binarized signals of the wobble signals, obtains pulse widths corresponding to deviations of phases of the binarized signal of the wobble signal as the criterion and the binarized signals of the other wobble signals and detects the phase differences.

According to this aspect, the plurality of detected wobble signals are binarized, and a phase difference between the binarized signals is obtained as a pulse width, so that a relatively simple digital circuit can be used to control the delay amount as described above.

In further aspect of the present invention, the delay amount control device detects the phase differences between the wobble signal as a criterion and the other wobble signals, and obtains the delay amounts so that the phase differences are brought close to zero.

According to this aspect, a crosstalk removal device uses the delayed reproduction signal to detect the phase difference as described above, and controls the delay amount in such a manner that the phase difference is brought close to zero. Therefore, a fluctuation of the delay amount with time is constantly fed back and corrected, and the optimum delay amount can steadily be kept.

In further aspect of the present invention, the delay amount control device detects a zero cross of the wobble signal as the criterion, and uses the zero cross as a timing criterion to detect the phase differences.

According to the present invention, to detect the phase difference between the wobble signal as the criterion and the other wobble signals, a zero cross of the wobble signal is detected. In this constitution, the phase difference is detected by a simple processing and the delay amount can be controlled as described above.

DESCRIPTION OF THE PREFERRED EMBODIMENTS

Preferred embodiments of the present invention will be described hereinafter with reference to the accompanying drawings. Two embodiments will be described hereinafter in detail. In the embodiments, the present invention is applied to an information reproduction apparatus which reproduces an optical disk corresponding to a DVD format and outputs user data to the outside, and which includes a constitution of a crosstalk removal apparatus.

(First Embodiment)

Figure 1:
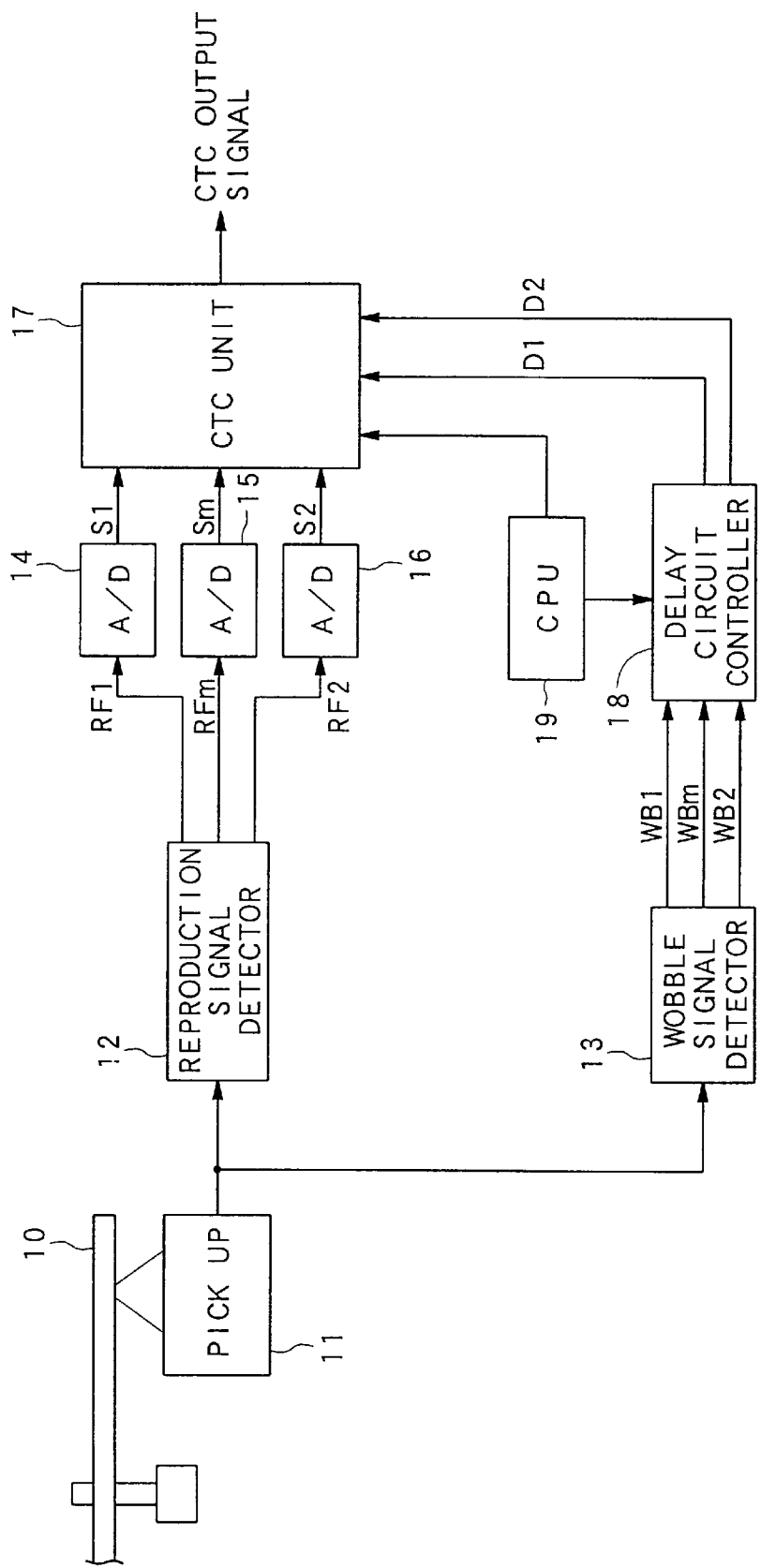
FIG. 1 is a block diagram showing a main part constitution of an information reproduction apparatus according to a first embodiment.

FIG. 1 is a block diagram showing a main part constitution of the information reproduction apparatus according to a first embodiment. The information reproduction apparatus shown in FIG. 1 is provided with a pickup 11, reproduction signal detector 12, wobble signal detector 13, A/D converters 14 to 16, crosstalk canceller (CTC) unit 17, delay circuit controller 18, and CPU 19, and performs a reproduction operation of the user data recorded s in an inserted disk 10.

In the above-described constitution, a rewritable DVD disk such as DVD-RAM is assumed as the disk 10. That is, when a delay amount of a crosstalk canceller is controlled as described later, a wobble signal detected during reproduction of the disk 10 is used. Therefore, the information reproduction apparatus is constituted to reproduce the DVD-RAM in which a track is subjected to a wobbling beforehand.

The pickup 11 irradiates the track of the rotated/driven disk 10 with the light beam, and generates a detection signal based on a reflected light. Moreover, in the first embodiment, the pickup 11 irradiates three tracks disposed adjacent to one another on the disk 10 with three light beams, and the crosstalk of the adjacent tracks to the main track as a reproduction object is removed, so that a reproduction quality is improved.

Figure 2:
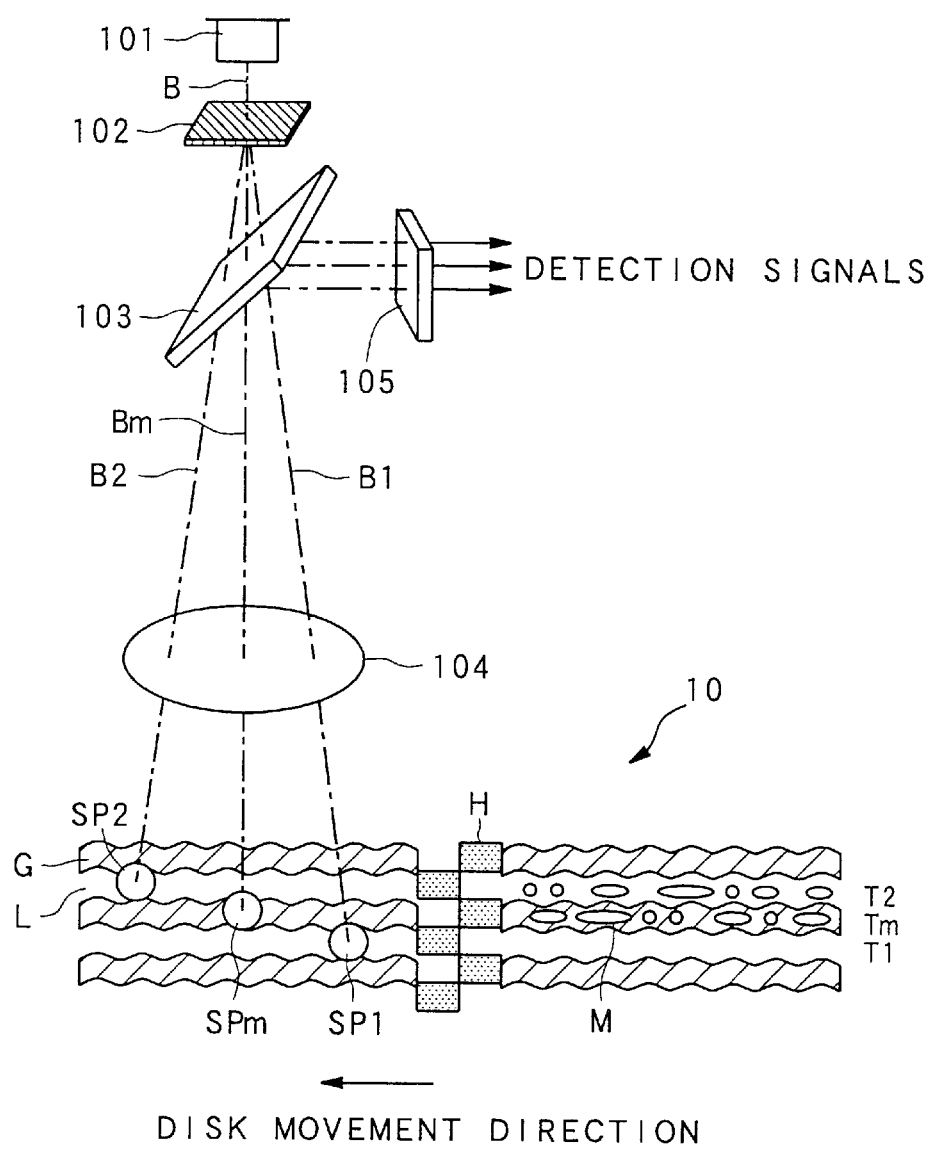
FIG. 2 is a diagram showing an irradiation state of a light beam in an optics of a pickup and an optical disk as a constitution for removing a crosstalk.

Here, FIG. 2 is a diagram showing an irradiation state of the light beams in an optics of the pickup 11 and the disk 10 as a constitution for removing the crosstalk. As shown in FIG. 2, the optics of the pickup 11 includes a laser 101, diffraction grating 102, beam splitter 103, objective lens 104, and photodetector 105.

As shown in FIG. 2, land tracks L and groove tracks G having different heights are alternately formed in an information recording surface of the disk 10 in accordance with a land groove recording system for use in the DVD-RAM. In general, information is recorded in the disk 10 based on a phase change system, and a reversible change of a recording material between a crystal state and an amorphous state is used. During rewriting of the disk 10, recording marks M corresponding to the user data, following headers H, are formed in the land tracks L and groove tracks G.

The land tracks L and groove tracks G are allowed to meander in a disk radius direction in a constant period and subjected to the wobbling. When the wobble signal corresponding to the wobbling is detected during the reproduction, the wobble signal can be used as a criterion of a timing control. Additionally, in the first embodiment, the wobble signal is used in controlling the delay amount of the crosstalk canceller as described later in detail.

In FIG. 2, a light beam B emitted from the laser 101 is split into a main beam Bm and two sub beams B1, B2 by an action of the diffraction grating 102. These three light beams are transmitted through the beam splitter 103, and emitted to three tracks disposed adjacent to one another in the information recording surface of the disk 10 via the objective lens 104. The main beam Bm is emitted to a main track Tm as the reproduction object, and forms a beam spot SPm. Moreover, one sub beam B1 is emitted to an adjacent track T1 of the main track Tm, and forms a beam spot Sp1. The other sub beam B2 is emitted to the other adjacent track T2 of the main track Tm, and forms a beam spot SP2. Additionally, FIG. 2 shows the groove track G as the main track and the land tracks L as the adjacent tracks T1, T2.

Furthermore, the reflected light from the beam spot SPm by the main beam Bm and reflected lights from the beam spots SP1, SP2 by the respective sub beams B1, B2 are reflected by the beam splitter 103 via the objective lens 104, and received by the photodetector 105. The photodetector 105 has a divided shape, photoelectrically converts the reflected lights in respective divided regions and outputs detection signals. Reproduction signal RFm and wobble signal WBm (FIG. 1) of the main track Tm and reproduction signals RF1, RF2 and wobble signals WB1, WB2 (FIG. 1) of two adjacent tracks T1, T2 are generated based on the detection signals.

In FIG. 2, the beam spot SPm by the main beam Bm, and beam spots SP1, SP2 by two sub beams B1, B2 are ideally arranged in a disk radius direction in a preferable arrangement. However, since a track pitch of the disk 10 is narrow, as shown in FIG. 2, the respective beam spots SPm, SP1, SP2 are arranged on a slanting line at predetermined intervals in a track tangent direction in order to prevent three beam spots from overlapping with one another. Therefore, the three reproduction signals RFm, RF1, RF2 cause delays corresponding to the intervals of the respective beam spots SPm, SP1, SP2 in the disk tangent direction. Since the delays fluctuate with an elapse of time, it is necessary to control delay amounts with respect to the respective reproduction signals RFm, RF1, RF2. Concrete constitution and operation will be described later.

Next in FIG. 1, the detection signals of the photodetector 105 of the pickup 11 are outputted to the reproduction signal detector 12 and wobble signal detector 13. The reproduction signal detector 12 generates the above-described three reproduction signals RFm, RF1, RF2, and the wobble signal detector 13 generates the above-described three wobble signals WBm, WB1, WB2. Here, the constitutions of the reproduction signal detector 12 and wobble signal detector 13 including the constitution of the photodetector 105 will be described with reference to FIGS. 3 and 4.

Figure 3:
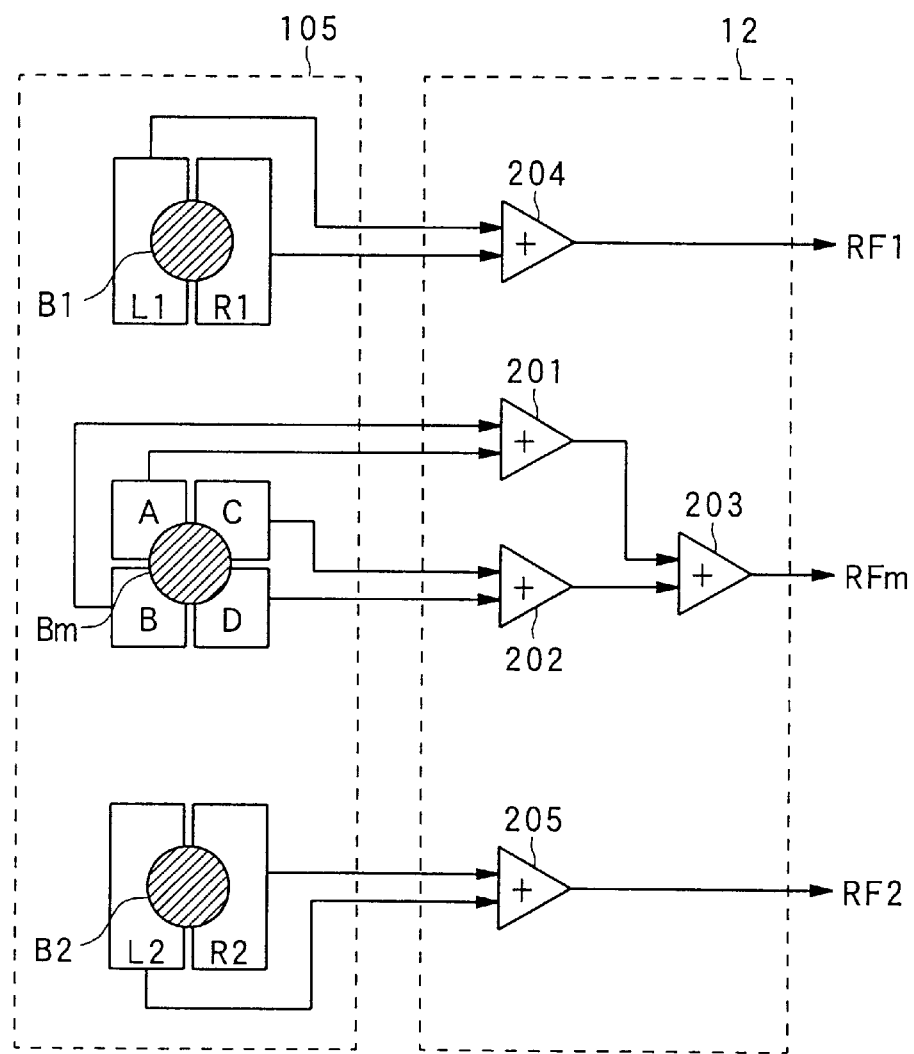
FIG. 3 is a diagram showing the constitution of a reproduction signal detector according to the first embodiment.

FIG. 3 is a diagram showing the constitution of the reproduction signal detector 12. In FIG. 3, in the photodetector 105, a detector disposed in a middle and having a quarter divided shape receives the main beam Bm reflected by the main track Tm. Moreover, two detectors disposed on opposite sides and having half divided shapes receive the sub beams B1, B2 reflected by the adjacent tracks T1, T2. Additionally, a vertical direction with respect to each detector of FIG. 3 is a direction extending along each track of the disk 10.

The reproduction signal detector 12 includes five adders 201 to 205. Moreover, with respect to the main beam Bm, the adder 201 adds the respective detection signals of regions A and B, and the adder 202 adds the respective detection signals of regions C and D. Furthermore, the adder 203 adds respective outputs of the adders 201 and 202. As a result, the respective detection signals of all the regions A to D are added and the reproduction signal RFm is generated.

On the other hand, with respect to the sub beam B1, the adder 204 adds the respective detection signals of regions L1 and R1 and the reproduction signal RF1 is generated. Similarly, with respect to the sub beam B2, the adder 205 adds the respective detection signals of regions L2 and R2 and the reproduction signal RF2 is generated.

Figure 4:
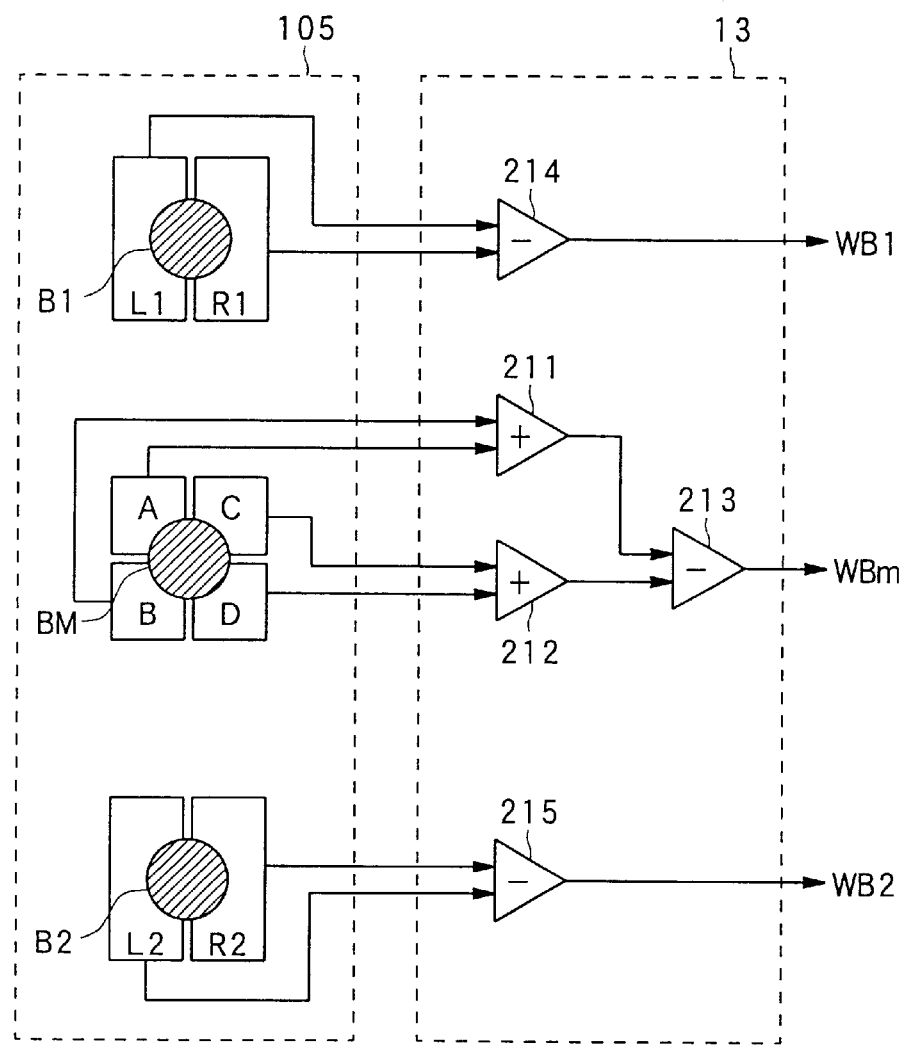
FIG. 4 is a diagram showing the constitution of a wobble signal detector according to the first embodiment.

Next, FIG. 4 is a diagram showing the constitution of the wobble signal detector 13 as wobble signal detection means. In FIG. 4, the constitution of the photodetector 105 is similar to that of FIG. 3. The wobble signal detector 13 includes two adders 211, 212 and three subtracters 213 to 215. Moreover, with respect to the main beam Bm, the adder 211 adds the respective detection signals of the regions A and B, and the adder 212 adds the respective detection signals of the regions C and D. Furthermore, the subtracters 213 obtains a difference of respective outputs of the adders 211 and 212. As a result, the wobble signal WBm corresponding to a push-pull output in the main track Tm is detected.

On the other hand, with respect to the sub beam B1, the subtracter 214 obtains the difference of the respective detection signals of the regions L1 and R1, and the wobble signal WB1 corresponding to the push-pull output in the sub track T1 is detected. Similarly, with respect to the sub beam B2, the subtracter 215 obtains the difference of the respective detection signals of the regions L2 and R2, and the wobble signal WB2 corresponding to the push-pull output in the sub track T2 is detected.

Next in FIG. 1, three reproduction signals RFm, RF1, RF2 outputted from the reproduction signal detector 12 are supplied to the A/D converters 14 to 16. The A/D converter 15 samples the reproduction signal RFm of the main track Tm and generates sample value series Sm, and the A/D converters 14, 16 sample the reproduction signals RF1, RF2 of the adjacent tracks T1, T2 and generate sample value series S1, S2. The sample value series Sm, S1, S2 generated by the A/D converters 14 to 16 are supplied to the CTC unit 17.

The CTC unit 17 as crosstalk removal means subjects the above-described three sample value series Sm, S1, S2 to a predetermined calculation processing, and generates a CTC output signal from which the influence of the crosstalk by the adjacent tracks is removed. In this case, the CTC unit 17 includes a delay circuit described later in which the delays present among the respective reproduction signals RFm, RF1, RF2 are corrected. Additionally, delay amounts D1, D2 appropriately adjusted by the delay circuit controller 18 are supplied to the CTC unit 17.

Three wobble signals WBm, WB1, WB2 outputted from the wobble signal detector 13 are supplied to the delay circuit controller 18. The delay circuit controller 18 detects a phase difference between the wobble signals as described later, and obtains and outputs the delay amounts D1, D2 for correcting the delays present among the respective reproduction signals RFm, RF1, RF2 based on the phase difference.

Additionally, the concrete constitution and operation of the CTC unit 17 and delay circuit controller 18 will be described later.

The CPU 19 is means for entirely controlling the reproduction operation of the information reproduction apparatus. The CPU 19 controls the operations of the CTC unit 17 and delay circuit controller 18, and constantly manages a state of each component during the control of the delay amounts as described later.

Figure 5:
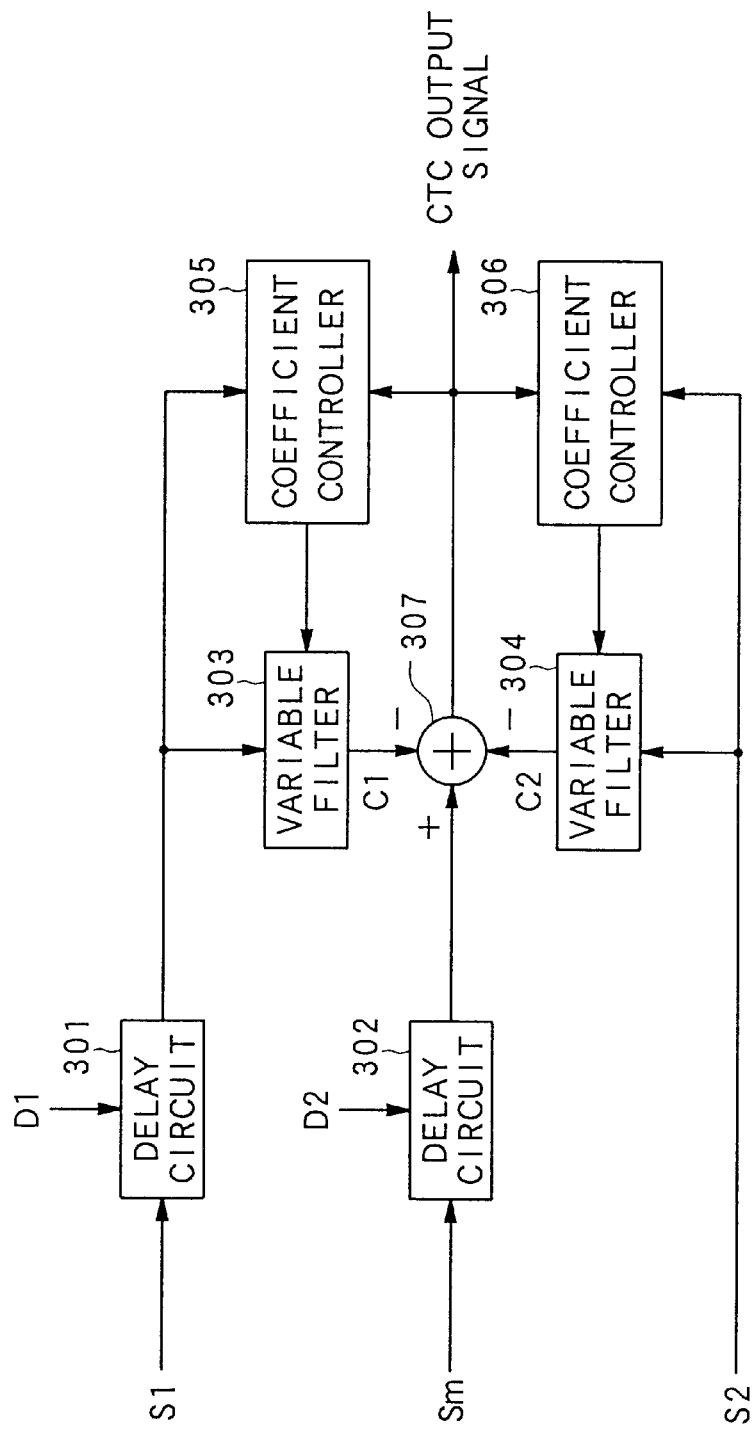
FIG. 5 is a block diagram showing the constitution of a CTC unit according to the first embodiment.

The concrete constitution and operation of the CTC unit 17 will next be described. FIG. 5 is a block diagram showing the constitution of the CTC unit 17. As shown in FIG. 5, delay circuits 301, 302, variable filters 303, 304, coefficient controllers 305, 306, and adder/subtracter 307 constitute the CTC unit 17. In the constitution of FIG. 5, the sample value series S2 for the adjacent track T2 are used as the criteria to correct the delays of the sample value series Sm for the main track Tm and the sample value series S1 for the adjacent track T1.

In FIG. 5, the delay circuit 301 delays and outputs the sample value series S1 corresponding to the adjacent track T1 by the delay amount D1 controlled by the delay circuit controller 18. Similarly, the delay circuit 302 delays and outputs the sample value series Sm corresponding to the main track Tm by the delay amount D2 controlled by the delay circuit controller 18. The delay circuits 301, 302 can be constituted, for example, using a First In First Out (FIFO) memory. In the constitution, the delays are controlled in such a manner that the respective inputted sample value series S1, Sm are successively stored in the FIFO memory, and read out and outputted in order of storage with an elapse of time corresponding to the delay amounts D1, D2.

The variable filter 303 successively shifts and inputs the delayed/corrected sample value series S1, performs a filter operation in a constitution of n variably controlled taps using n tap coefficients, and calculates a crosstalk signal C1 corresponding to a crosstalk component from the adjacent track T1. Moreover, the variable filter 304 successively shifts and inputs the sample value series S2 corresponding to the adjacent track T2, performs the filter operation in the constitution of n variably controlled taps using n tap coefficients, and calculates a crosstalk signal C2 corresponding to the crosstalk component from the adjacent track T2.

Additionally, when the number n of taps of the variable filters 303, 306 is increased, higher-precision filter operation can be performed, and removal ability of the crosstalk component in the CTC unit 17 is improved. However, with the increase of the tap number n, the constitutions of the variable filters 303, 304 become complicated, and a circuit scale of the CTC unit 17 is increased. Therefore, the variable filters 303, 304 are constituted with an appropriate tap number n in consideration of a balance of capability and circuit scale.

Subsequently, the coefficient controller 305 controls the tap coefficient in the variable filter 303 so as to handle the fluctuation of the crosstalk by the adjacent track T1. Similarly, the coefficient controller 306 controls the tap coefficient in the variable filter 304 so as to handle the fluctuation of the crosstalk by the adjacent track T2. In the coefficient controllers 305, 306, the CTC output signals are inputted in addition to the sample value series S1, S2, and a magnitude of the crosstalk is judged based on the deviation of the zero cross of the CTC output signal. Moreover, the tap coefficients of the variable filters 303, 304 are gradually changed to minimize the crosstalk.

The adder/subtracter 307 subtracts the crosstalk signal C1 corresponding to the adjacent track T1 and the crosstalk signal C2 corresponding to the adjacent track T2 from the delayed/corrected sample value series S1 corresponding to the main track Tm, and outputs the CTC output signal. In the CTC output signal obtained in this manner, the crosstalk components by the adjacent tracks T1, T2 are removed on the condition that an ideal filter operation is performed.

Figure 6:
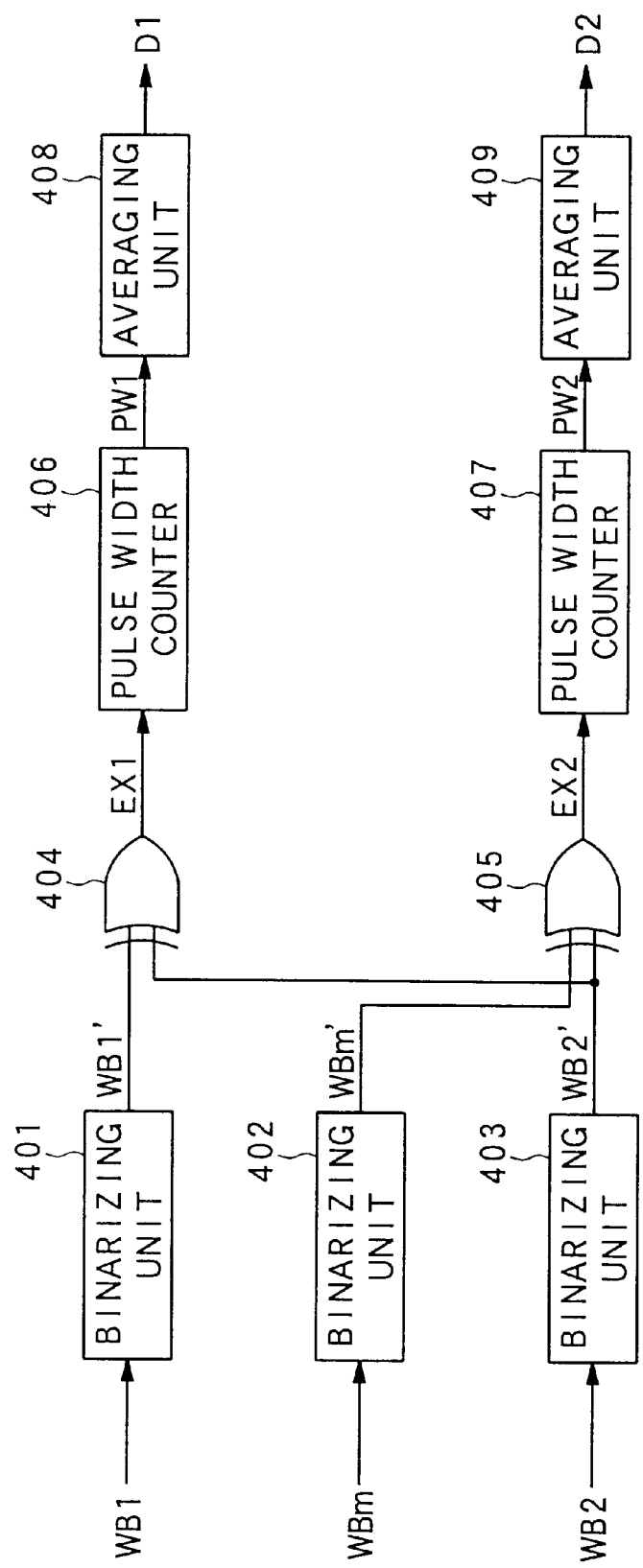
FIG. 6 is a block diagram showing the constitution of a delay circuit controller according to the first embodiment.
Figure 7:
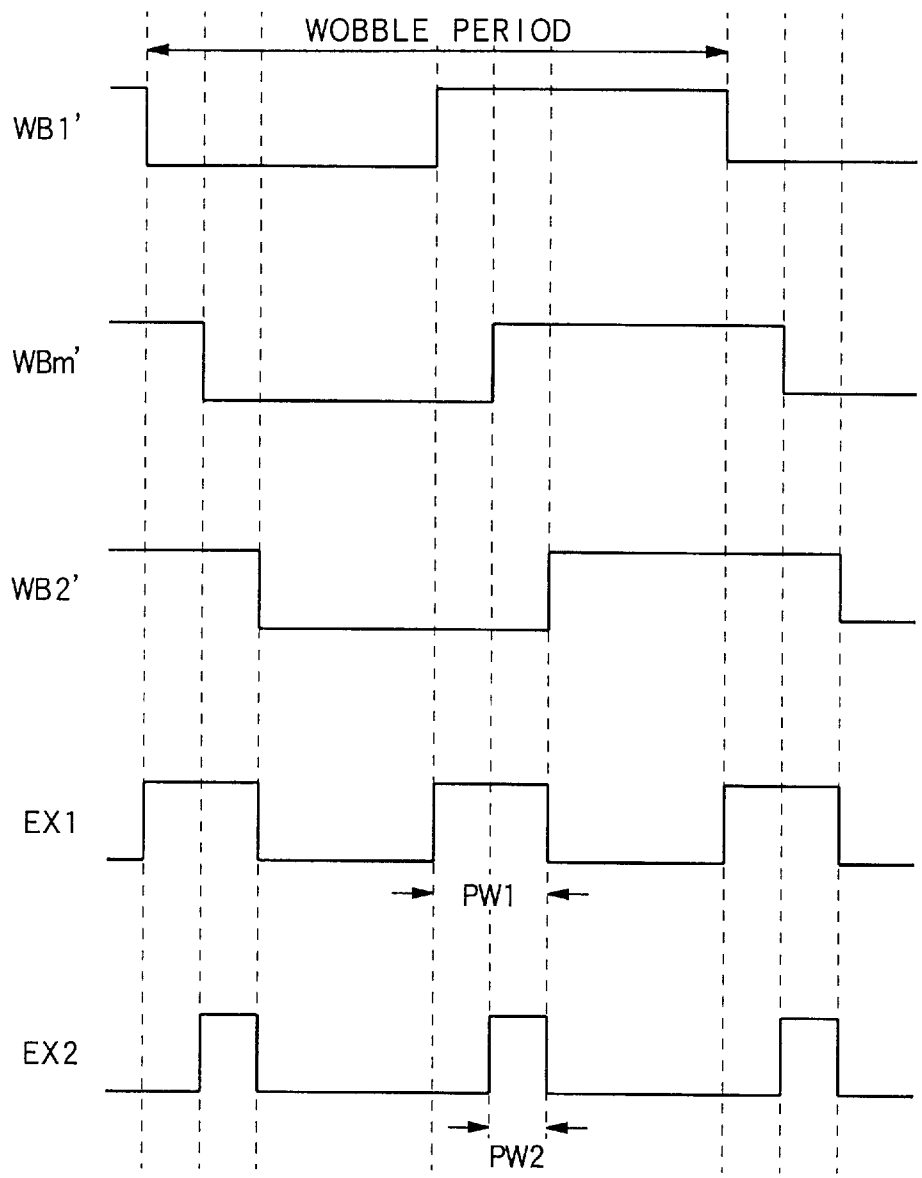
FIG. 7 is a waveform diagram in the constitution of FIG. 6.

The concrete constitution and operation of the delay circuit controller 18 as a delay amount control device will next be described. FIG. 6 is a block diagram showing the constitution of the delay circuit controller 18. Moreover, FIG. 7 is a waveform diagram in the constitution of FIG. 6. As shown in FIG. 6, binarizing units 401 to 403, EXOR circuits 404, 405, pulse width counters 406, 407, and averaging units 408, 409 constitute the delay circuit controller 18. In this constitution, the sample value series S2 corresponding to the adjacent track T2 are used as the criterion to correct the delays of the sample value series Sm corresponding to the main track Tm and the sample value series S1 corresponding to the adjacent track T1.

In FIG. 6, the binarizing units 401 to 403 use a predetermined threshold value as the criterion to binarize the respective inputted wobble signals, and generates corresponding binarized signals. The binarizing unit 401 generates a binarized wobble signal WB1' corresponding to the adjacent track T1, the binarizing unit 402 generates a binarized wobble signal WBm' corresponding to the main track Tm, and the binarizing unit 403 generates a binarized wobble signal WB2' corresponding to the adjacent track T2.

FIG. 7 shows respective waveform patterns of the above-described three binarized wobble signals WB1', WBm', WB2'. The binarized wobble signals WB1', WBm', WB2' have the waveform patterns having constant periods corresponding to wobbling periods, but deviate in the phase from one another. That is, the phase differences corresponding to the intervals of the respective beam spots SPm, SP1, SP2 shown in FIG. 2 in the track tangent direction are generated. Additionally, since a wobble frequency is set to be sufficiently small, phase deviations among the respective binarized wobble signals WB1', WBm', WB2' are within one period.

Subsequently, the EXOR circuit 404 takes an exclusive OR of the binarized wobble signal WB1' corresponding to the adjacent track T1 and the binarized wobble signal WB2' corresponding to the adjacent track T2 and outputs a signal EX1. Moreover, the EXOR circuit 405 takes an exclusive OR of the binarized wobble signal WBm' corresponding to the main track Tm and the binarized wobble signal WB2' corresponding to the adjacent track T2 and outputs a signal EX2. Additionally, the binarized wobble signal WB2' corresponding to the adjacent track T2 used as the criterion as described above is inputted to each of the two EXOR circuits 404, 405.

Here, FIG. 7 shows the waveform patterns of the respective signals EX1, EX2 outputted from the EXOR circuits 404, 405. As seen from these waveform patterns, the circuits output pulses which become high level during deviation of the phases of the respective inputted two binarized wobble signals. A pulse width PW1 of the signal EX1 from the EXOR circuit 404 corresponds to the phase difference of the wobble signals between the adjacent tracks T1 and T2, and thereby the delay amount D1 between these tracks can be distinguished. Moreover, a pulse width PW2 of the signal EX2 from the EXOR circuit 405 corresponds to the phase difference of the wobble signals between the main track Tm and the adjacent track T2, and thereby the delay amount D2 between these tracks can be distinguished.

The pulse width counter 406 detects the pulse width PW1 of the signal EX1 from the EXOR circuit 404. Moreover, the pulse width counter 407 detects the pulse width PW2 of the signal EX2 from the EXOR circuit 405. Concretely, the pulse width counters 406, 407 may count predetermined clocks and obtain counted values, while pulses included in the respective signals EX1, EX2 from the EXOR circuits 404, 405 are high level within one period.

The averaging unit 408 calculates an average value of the counted values outputted from the pulse width counter 406 in a predetermined time range, and outputs the average value as the delay amount D1. Moreover, the averaging unit 409 calculates the average value of the counted values outputted from the pulse width counter 407 in the predetermined time range, and outputs the average value as the delay amount D2. The averaging units 407, 408 performs this averaging processing so as to prevent the delay amounts D1, D2 from fluctuating with a short-period noise.

As described above, in the first embodiment, the delay amounts D1, D2 obtained by the delay circuit controller 18 shown in FIG. 6 are determined in the delay circuits 301, 302 of the CTC unit 17 at a predetermined timing during the control of the delay amounts. In a usual technique, when the delay amount is set for the CTC unit 17, for example, the delay amount for minimizing the jitter amount is obtained. Therefore, it is presumed that a stationary crosstalk to the main track Tm from the adjacent tracks T1, T2 is present. However, the disks such as the DVD-RAM have problems, when the adjacent tracks T1, T2 are unrecorded and the stationary crosstalk is not present. In the first embodiment, even when the adjacent tracks T1, T2 are unrecorded, the wobble signals can be detected, and thereby the optimum delay amounts can constantly be obtained.

(Second Embodiment)

Figure 8:
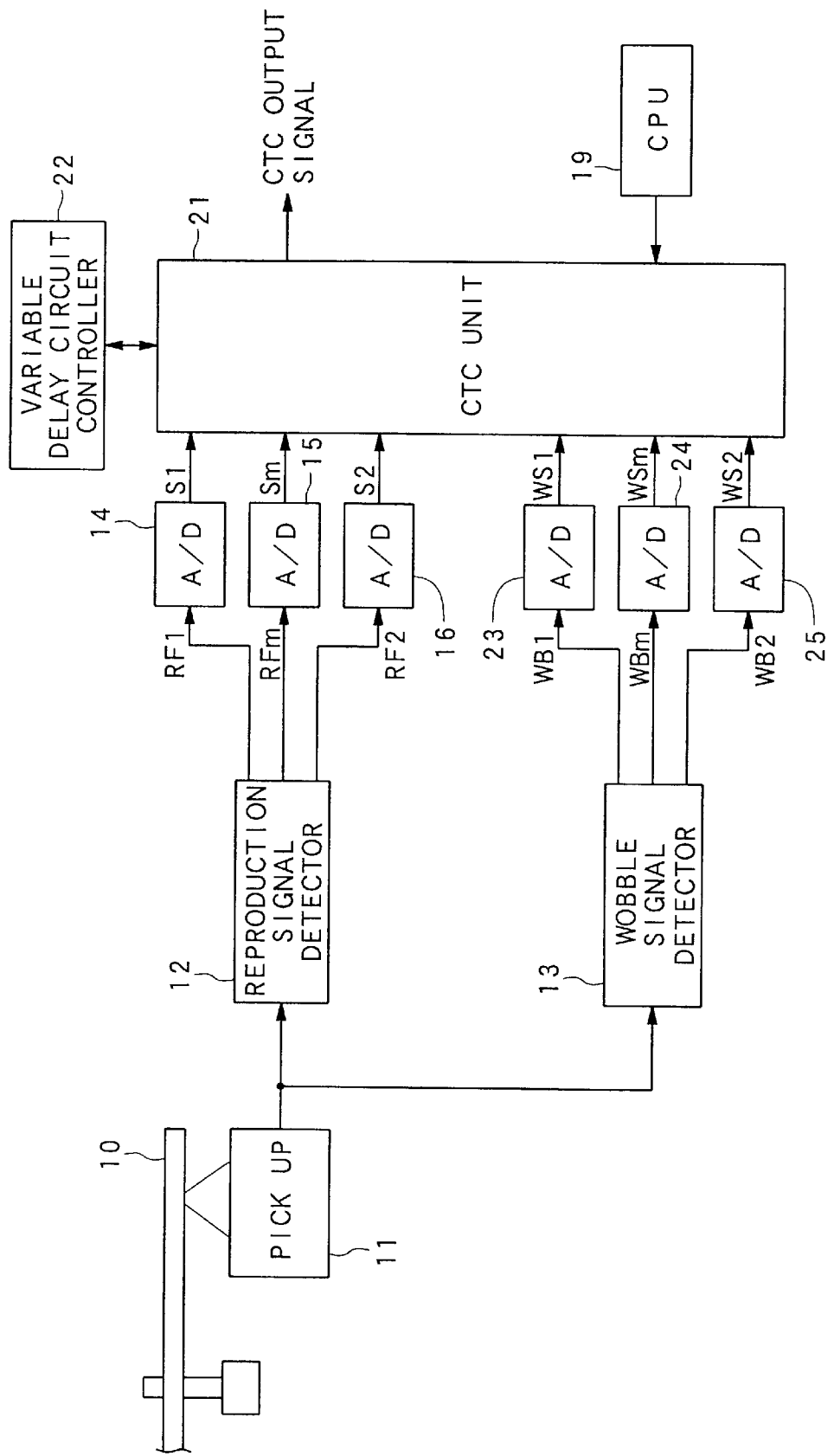
FIG. 8 is a block diagram showing the main part constitution of the information reproduction apparatus according to a second embodiment.

FIG. 8 is a block diagram showing the main part constitution of the information reproduction apparatus according to a second embodiment. The information reproduction apparatus shown in FIG. 8 is provided with the pickup 11, reproduction signal detector 12, wobble signal detector 13, A/D converters 14 to 16, CPU 19, crosstalk canceller (CTC) unit 21, variable delay circuit controller 22, and A/D converters 23 to 25, and performs the reproduction operation of the user data recorded in the inserted disk 10.

In the above-described constitution, since the pickup 11, reproduction signal detector 12, wobble signal detector 13, A/D converters 14 to 16, CPU 19 and disk 10 are similar to those of the first embodiment, description thereof is omitted. The second embodiment shown in FIG. 8 is different from the first embodiment in that the variable delay circuit controller 22 and A/D converters 23 to 25 are disposed instead of the delay circuit controller 18.

In FIG. 8, the CTC unit 21 subjects the sample value series Sm, S1, S2 obtained by the functions of the pickup 11, reproduction signal detector 12, and A/D converters 14 to 16 to a predetermined calculation processing, and generates the CTC output signal from which the influence of the crosstalk by the adjacent tracks is removed. Moreover, wobble sample value series WS1, WSm, WS2 generated by the A/D converters 23 to 25, respectively, are supplied to the CTC unit 21 based on the wobble signals WB1, WBm, WB2 outputted from the wobble signal detector 13. Here, the CTC unit 21 of the second embodiment is different from that of the first embodiment in the constitution and operation.

Figure 9:
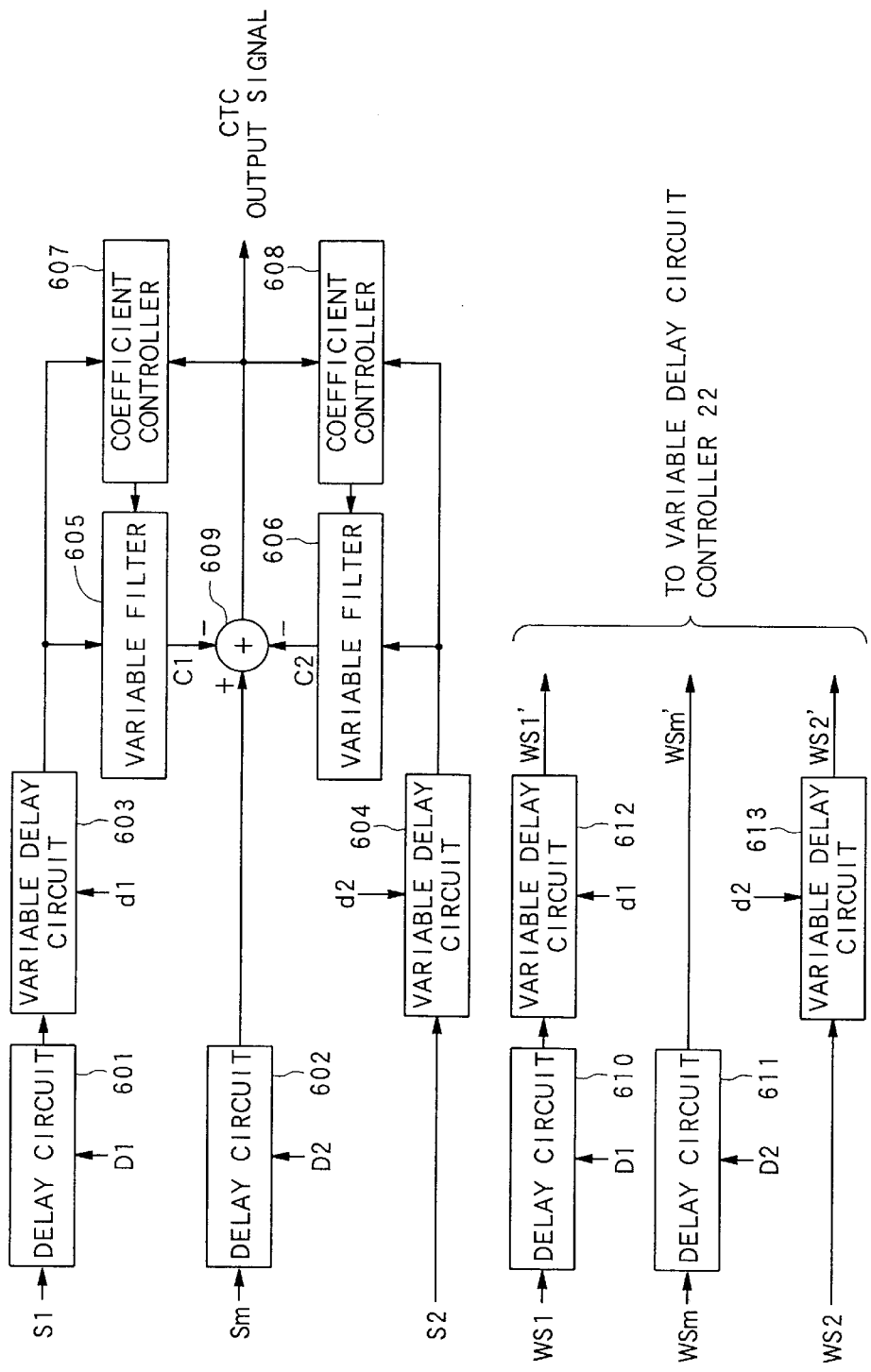
FIG. 9 is a block diagram showing the constitution of the CTC unit according to the second embodiment.

FIG. 9 is a block diagram showing the constitution of the CTC unit 21. As shown in FIG. 9, delay circuits 601, 602, variable delay circuits 603, 604, variable filters 605, 606, coefficient controllers 607, 608, adder/subtracter 609, delay circuits 610, 611, and variable delay circuits 612, 613 constitute the CTC unit 21. In the constitution of FIG. 9, the sample value series Sm for the main track Tm are used as the criteria to correct a fluctuation with time in the delays of the sample value series S1 for the adjacent track T1 and the sample value series S2 for the adjacent track T2.

In FIG. 9, the delay circuit 601 delays and outputs the sample value series S1 corresponding to the adjacent track T1 by the predetermined and fixed delay amount D1. Similarly, the delay circuit 602 delays and outputs the sample value series Sm corresponding to the main track Tm by the predetermined and fixed delay amount D2. For the delay amounts D1, D2 in the delay circuits 601, 602, predetermined values corresponding to the intervals between the beam spot SP2 and the beam spots SP1, SPm in the disk tangent direction shown in FIG. 2 may be set.

These delay circuits 601, 602 can be constituted, for example, using the First In First Out (FIFO) memory. In the constitution, the delays are controlled in such a manner that the respective inputted sample value series S1, Sm are successively stored in the FIFO memory, and read out and outputted in order of storage with an elapse of time corresponding to the delay amounts D1, D2.

The variable delay circuit 603 delays and outputs the sample value series S1 delayed by the delay circuit 601 by a variable delay amount d1 supplied from the variable delay circuit controller 22. Similarly, the variable delay circuit 604 delays and outputs the sample value series S2 corresponding to the adjacent track T2 by a variable delay amount d2 supplied from the variable delay circuit controller 22. In this manner, the variable delay circuits 603, 604 are disposed separately from the fixed delay circuits 601, 602. In the constitution, when the delay fluctuates in a relatively narrow range, the delay amounts d1, d2 may not be set to large values.

The variable delay circuits 603, 604 can be constituted, for example, using a shift register and selector circuit. That is, the sample value series are successively inputted into the shift register, and the data of the timing corresponding to the delay amounts d1, d2 may be selected and outputted by a selector.

Additionally, in FIG. 9, the variable filters 605, 606, coefficient controllers 607, 608, and adder/subtracter 609 have functions similar to those of the CTC unit 17 (FIG. 5) of the first embodiment.

On the other hand, in FIG. 9, the delay circuit 610 delays and outputs the wobble sample value series WS1 corresponding to the adjacent track T1 by the above-described delay amount D1. Similarly, the delay circuit 611 delays and outputs the wobble sample value series WSm corresponding to the main track Tm by the above-described delay amount D2. Moreover, the variable delay circuit 612 delays and outputs the wobble sample value series WS1 delayed by the delay circuit 610 by the above-described delay amount d1. Similarly, the variable delay circuit 613 delays and outputs the wobble sample value series WS2 corresponding to the adjacent track T2 by the above-described delay amount d2. In this manner, the respective wobble sample value series WS1, WSm, WS2 are processed by the constitution similar to that of the sample value series Sm, S1, S2.

The delayed/corrected wobble sample value series WS1' outputted from the variable delay circuit 612, the delayed/corrected wobble sample value series WSm' outputted from the delay circuit 611, and the delayed/corrected wobble sample value series WS2' outputted from the variable delay circuit 604 are supplied to the variable delay circuit controller 22, respectively. The variable delay circuit controller 22 detects the wobble signals and obtains the delay amounts d1, d2 based on the respective wobble sample value series WS1', WSm', WS2'. Details will be described later.

Figure 10:
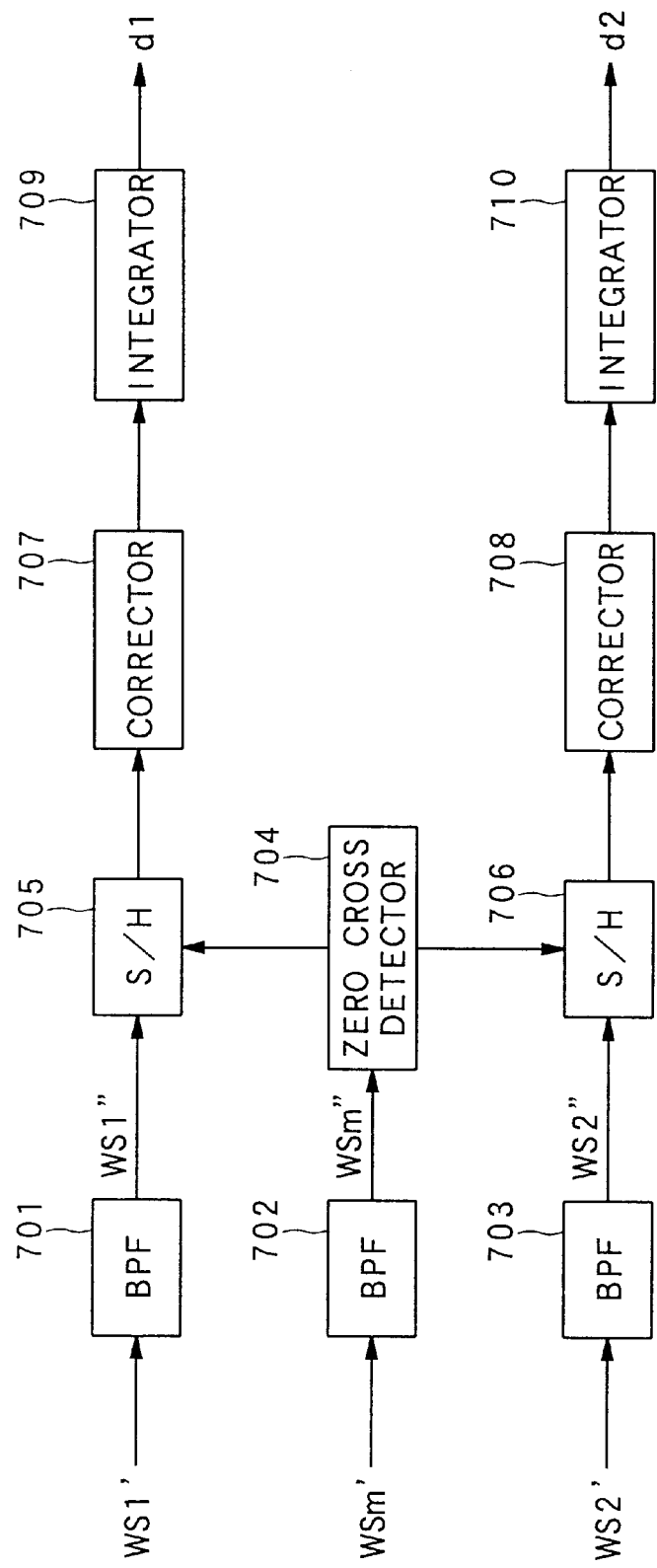
FIG. 10 is a block diagram showing the constitution of a variable delay circuit controller according to the second embodiment.

Next, FIG. 10 is a block diagram showing the constitution of the variable delay circuit controller 22 as a wobble signal detection device and delay amount control device. As shown in FIG. 10, the variable delay circuit controller 22 is provided with band pass filters (BPFs) 701, 702, 703, zero cross detector 704, sample holders 705, 706, correctors 707, 708, and integrators 709, 710.

In FIG. 10, the delayed/corrected wobble sample value series WS1', WSm', WS2' supplied from the CTC unit 21 are inputted into the BPF 701 to 703, respectively. The BPFs 701 to 703 are band pass filters which remove unnecessary frequency components other than the wobble frequency components, and output wobble sample value series WS1", WSm", WS2" including only the wobble frequency components. That is, in the second embodiment, S/N is secured by the actions of BPF 701 to 704, and the respective wobble signals are detected.

The zero cross detector 704 analyzes the wobble sample value series WSm" corresponding to the main track Tm, and detects a zero cross timing. The zero cross timing of the wobble signal detected by the zero cross detector 704 is supplied to the sample holders 705, 706, and used as the criterion of the phase with respect to the wobble sample value series WS1", WS2" corresponding to the respective adjacent tracks T1, T2.

The sample holder 705 sample-holds the wobble sample value series WS1" corresponding to the adjacent track T1 in the zero cross timing supplied from the zero cross detector 704. Similarly, the sample holder 706 sample-holds the wobble sample value series WS2" corresponding to the adjacent track T2 in the zero cross timing supplied from the zero cross detector 704. Therefore, in the respective sample holders 705, 706, the sample value corresponding to the zero cross timing continues to be held during one period of the wobble sample value series WS1", WS2".

Figure 11A:
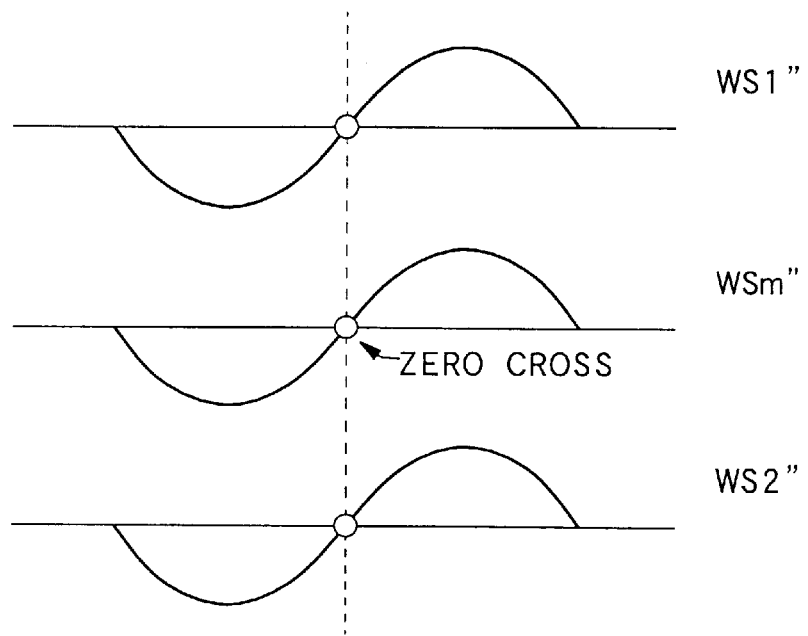
FIG. 11 is an explanatory view of a phase relation of three wobble signals in FIG. 10.

Here, a phase relation of three wobble sample value series WS1", WSm", WS2" will be described with reference to FIGS. 11A and 11B. FIG. 11A shows the phase relation in a state in which the optimum delay correction is performed and three wobble sample value series WS1", WSm", WS2" are matched in the phase. In the ideal state shown in FIG. 11A, the zero cross timing of the wobble sample value series WSm" detected by the zero cross detector 704 agrees with the zero cross timings of the other wobble sample value series WS1", WS2". Therefore, the respective sample holders 705, 706 output zero cross samples included in the wobble sample value series WS1", WS2".

Figure 11B:
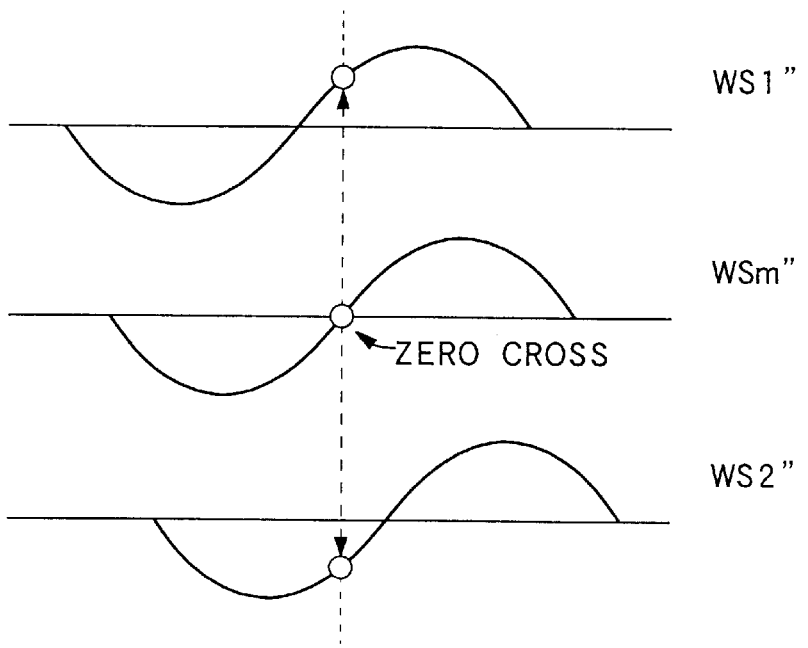

On the other hand, FIG. 11B shows the phase relation in a state in which the delay correction is not optimum and three wobble sample value series WS1", WSm", WS2" deviate from one another in the phase. In the state shown in FIG. 11B, the zero cross timing of the wobble sample value series WSm" detected by the zero cross detector 704 does not agree with the zero cross timings of the other wobble sample value series WS1", WS2". Therefore, the respective sample holders 705, 706 output predetermined positive or negative sample values included in the wobble sample value series WS1", WSm", WS2". In this case, a direction in which the delay amount is changed can be judged from signs of the sample values outputted from the respective sample holders 705, 706.

The sample value outputted from the sample holder 705 is multiplied by a predetermined correction coefficient and outputted by the corrector 707, and subsequently integrated in the integrator 709. Similarly, the sample value outputted from the sample holder 706 is multiplied by the predetermined correction coefficient and outputted by the corrector 708, and subsequently integrated in the integrator 710. As a result, the respective integrators 710, 711 average the deviations of the phases in a certain degree of time range. When the delay correction is steadily performed, the integrated values in the integrators 709, 710 are close to zero. Therefore, the delay amounts d1, d2 are fed back to the CTC unit 21 in order to bring the phase difference of the wobble signal close to zero, and the optimum delay amount can be controlled. Additionally, the correction coefficients for use in the correctors 707, 708 may be set to appropriate values in accordance with correspondence between the phase deviations of the wobble sample value series WS1", WSm", WS2" and the delay amounts d1, d2.

Figure 12:
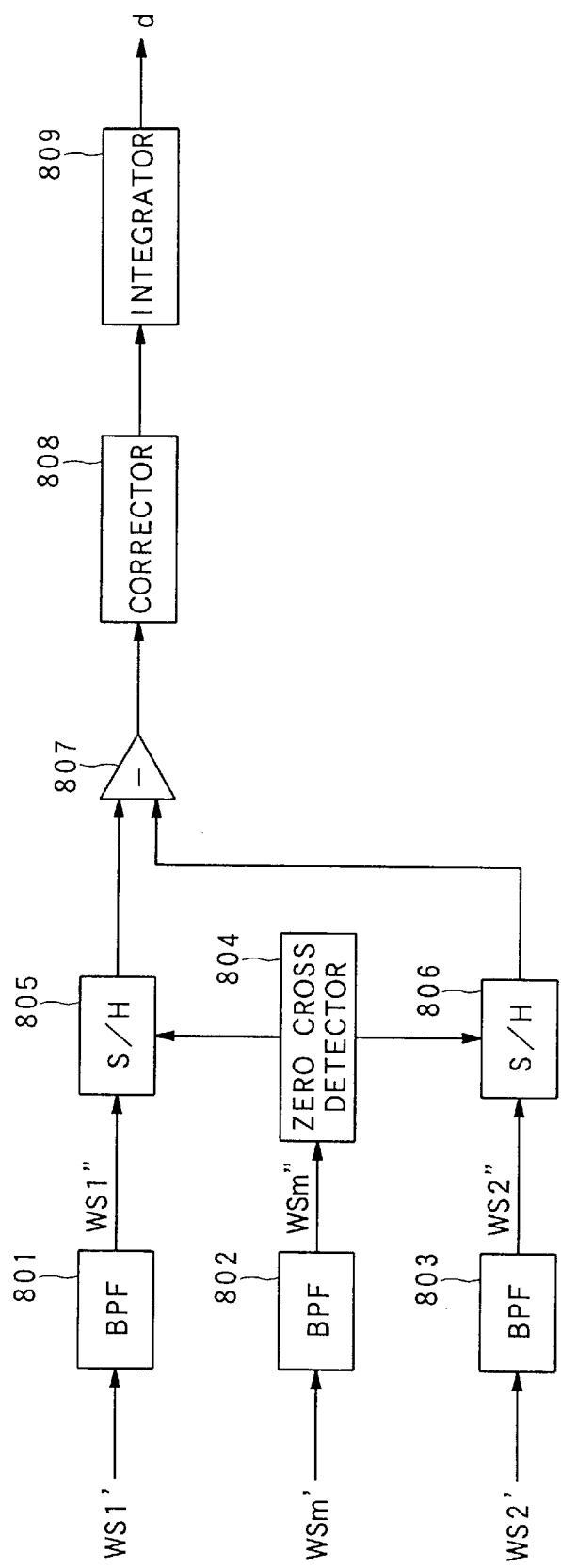
FIG. 12 is a block diagram showing a modification example of the variable delay circuit controller of FIG. 10.

Next FIG. 12 is a block diagram showing a modification example of the variable delay circuit controller 22 shown in FIG. 10. The variable delay circuit controller 22 shown in FIG. 12 comprises BPFs 801, 802, 803, zero cross detector 804, sample holders 805, 806, subtracter 807, corrector 808, and integrator 809. The modification example of FIG. 12 has a constitution in which one delay amount d is obtained and outputted. That is, it is noted that the delays in the respective adjacent tracks T1, T2 are substantially symmetric with respect to the main track Tm, and the positive/negative sign is added to one delay amount d.

Therefore, in FIG. 12, the subtracter 807 calculates a difference value between the sample value outputted from the sample holder 805 and the sample value outputted from the sample holder 806. Subsequently, the difference value outputted from the subtracter 807 is multiplied by the predetermined correction coefficient and outputted by the corrector 808, and integrated in the integrator 809. As a result, for example, the above-described delay amount d1 is set to +d, and the delay amount d2 may be set to −d based on the obtained delay amount d.

As described above, in the second embodiment, the delay amounts d1, d2 obtained by the variable delay circuit controller 22 shown in FIG. 10 or FIG. 12 are set in the variable delay circuits 603, 604, 612, 613 of the CTC unit 21 at a predetermined timing during the control of the delay amounts. The second embodiment is similar to the first embodiment in that even with the unrecorded adjacent tracks T1, T2, the wobble signal is detected and the optimum delay amount can constantly be obtained.

In this manner, according to the constitution of the first embodiment, the circuit scale can be reduced, and delay adjustment can be accelerated. Moreover, according to the constitution of the second embodiment, since the delay is readjusted based on the signal subjected to the delay adjustment, the precision of the delay adjustment can be improved.

Additionally, in the above-described embodiments, the present invention applied to the information reproduction apparatuses such as the DVD-RAM for reproducing the optical disk in accordance with the DVD format has been described. However, the present invention is not limited to this. The present invention can broadly be applied to the information reproduction apparatus using the information recording media of various formats in which the wobbling tracks are formed and the recording information can be recorded.

As described above, according to the present invention, the wobble signal is detected based on the wobbling applied to the tracks of the recordable information recording medium, and the delay amount is controlled during removal of the crosstalk. Therefore, there can be realized the crosstalk removal apparatus in which even with the unrecorded adjacent tracks, the wobble signals can be used to constantly obtain the optimum delay amounts and the crosstalk can be removed with a high precision.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-154501 filed on May 23, 2001 including the specification, claims, drawings and summary is incorporated herein by reference in its entirety.

What is claimed is:

1. A crosstalk removal apparatus which removes a crosstalk of one adjacent track and the other adjacent track included in a reproduction signal of a main track based on the reproduction signal of the main track as a reproduction object of an information recording medium and reproduction signals of the adjacent tracks, the crosstalk removal apparatus comprising:

a crosstalk removal device which delays the reproduction signals of the main track and the adjacent tracks by predetermined delay amounts corresponding to respective reproduction time differences, extracts the crosstalk from the reproduction signals of the one and other adjacent tracks, and removes the crosstalk from the reproduction signal of the main track;

a wobble signal detection device which detects wobble signals corresponding to a wobbling applied to the main track and the adjacent tracks; and a delay amount control device which obtains optimum delay amounts based on a phase relation of the detected wobble signals, and controls the delay amounts to be set with respect to the crosstalk removal device.

2. The crosstalk removal apparatus according to claim 1 wherein the delay amount control device detects phase differences between the wobble signal as a criterion and the other wobble signals, and obtains the optimum delay amounts corresponding to the phase differences.

3. The crosstalk removal apparatus according to claim 2 wherein the delay amount control device generates binarized signals of the wobble signals, obtains pulse widths corresponding to deviations of phases between the binarized signal of the wobble signal as the criterion and the binarized signals of the other wobble signals and detects the phase differences.

4. The crosstalk removal apparatus according to claim 1 wherein the delay amount control device detects the phase differences between the wobble signal as a criterion and the other wobble signals, and obtains said delay amounts so that the phase differences are brought close to zero.

5. The crosstalk removal apparatus according to claim 4 wherein the delay amount control device detects a zero cross of the wobble signal as the criterion, and uses the zero cross as a timing criterion to detect the phase differences.

6. An information reproduction apparatus which reproduces recording information from an information recording medium with tracks formed therein, the information reproduction apparatus comprising:

a reproduction device which generates respective reproduction signals based on reflected lights obtained in irradiating a main track as a reproduction object, one adjacent track, and the other adjacent track with light beams at predetermined intervals in a tangent direction;

a crosstalk removal device which delays the reproduction signals of the main track and the adjacent tracks by predetermined delay amounts corresponding to respective reproduction time differences, extracts a crosstalk from the reproduction signals of the one and other adjacent tracks, and removes the crosstalk from the reproduction signal of the main track;

a wobble signal detection device which detects wobble signals corresponding to a wobbling applied to the main track and the adjacent tracks; and a delay amount control device which obtains optimum delay amounts based on a phase relation of the detected wobble signals, and controls the delay amounts to be set with respect to the crosstalk removal device.

7. The information reproduction apparatus according to claim 6 wherein the delay amount control device detects phase differences between the wobble signal as a criterion and the other wobble signals, and obtains the optimum delay amounts corresponding to the phase differences.

8. The information reproduction apparatus according to claim 7 wherein the delay amount control device generates binarized signals of the wobble signals, obtains pulse widths corresponding to deviations of phases of the binarized signal of the wobble signal as the criterion and the binarized signals of the other wobble signals and detects the phase differences.

9. The information reproduction apparatus according to claim 6 wherein the delay amount control device detects the phase differences between the wobble signal as a criterion and the other wobble signals, and obtains the delay amounts so that the phase differences are brought close to zero.

10. The information reproduction apparatus according to claim 9 wherein the delay amount control device detects a zero cross of the wobble signal as the criterion, and uses the zero cross as a timing criterion to detect the phase differences.

* * * * *